United States Patent [19]

Hurt

[11] 4,153,926
[45] May 8, 1979

[54] CYCLIC ILLUMINATION DEVICE

[76] Inventor: Jackson D. Hurt, 3023 W. Morris St., Indianapolis, Ind. 46241

[21] Appl. No.: 772,542

[22] Filed: Feb. 28, 1977

[51] Int. Cl.² .............................................. F21V 21/30
[52] U.S. Cl. ........................................ 362/35; 362/239
[58] Field of Search .................. 240/49, 24, 71.2 R; 340/50, 87; 362/35, 239

[56] References Cited

U.S. PATENT DOCUMENTS

| | | | |
|---|---|---|---|
| 1,753,144 | 4/1930 | Bassett | 362/35 |
| 2,344,153 | 3/1944 | Leonard | 362/35 X |
| 2,719,715 | 10/1955 | Leahan | 362/35 |
| 2,814,029 | 11/1957 | McRea | 362/35 |
| 2,823,366 | 2/1958 | Schmitz, Jr. | 362/35 |
| 2,832,059 | 4/1958 | Adler, Jr. | 362/35 X |
| 2,846,663 | 8/1958 | Heehler et al. | 362/35 |
| 3,266,014 | 8/1966 | Leotta | 362/35 |
| 3,764,799 | 10/1973 | Schulz | 362/35 |
| 3,866,032 | 2/1975 | Veres | 362/48 X |
| 3,886,350 | 5/1975 | Katsukura et al. | 362/49 X |
| 3,963,917 | 6/1976 | Romano | 362/35 |
| 4,054,791 | 10/1977 | Du Shane | 362/35 |

Primary Examiner—Peter A. Nelson
Attorney, Agent, or Firm—Woodard, Weikart, Emhardt & Naughton

[57] ABSTRACT

A lighting apparatus for illumination of a surface. The disclosed embodiment includes a source of light, a reflector with the source of light at its focus point, a lens for concentrating light from the source to an area to be illuminated, and a motor. The motor rotates the source of light, the reflector and the lens at a rate of at least ten cycles per second, thereby moving the illuminated area along a path at the same rate. As the illuminated area is moved along the path at this rate, successive portions of the path, each portion being equal in area to the illuminated area, will be illuminated one by one. The rate of movement of the illuminated area along the path is faster than the human eye's ability to integrate the discontinuities of the individual illuminated areas and thus the entire path has the appearance of being illuminated simultaneously.

5 Claims, 5 Drawing Figures

CYCLIC ILLUMINATION DEVICE

BACKGROUND OF THE INVENTION

1. Field of the Invention

This invention relates in general to lighting devices and in particular to lighting devices used to illuminate a surface.

2. Description of the Prior Art

There are virtually hundreds of different types of lighting devices which are known to the art. Although these may range from the simplicity of a miniature light bulb to the sophistication of a motion picture lighting set, the function of each device is the same—to produce light for illumination of a surface. Associated with certain lighting devices is a reflector which collects a majority of the light rays coming from the source of light and guides this collected light in a particular direction. Systems typical of this type of operation are automobile headlamps, flashlights, and lighthouse beacons. Such systems may also incorporate lenses to further concentrate or focus the guided light.

Other lighting devices may employ the use of a pulsing or intermittent light source to repeatedly switch from an illuminating mode to an off mode. A stroboscope operates on this principal as do flashing neon signs and fluorescent lamps. Still other lighting devices used in the scientific or testing field employ the use of a stationary light source which is repeatedly reflected either by a rotating mirror arrangement or by a rotating mirror in combination with a static optical system. An example of such a system is disclosed in the U.S. Pat. No. 3,972,583, to Lobb.

One disadvantage with lighting devices whose only purpose is to illuminate an area is that if a reflector and/or lens is not used, a large portion of the light output may be lost by illuminating surfaces for which illumination is not desired. When a reflector is used, normally the lumens per square inch of light intensity are decreased in proportion to the increase in area which is being illuminated. Similarly, with a diverging stationary light source the distance of a surface from the source governs the intensity of the illumination of that surface. Lighting devices such as that of Lobb which incorporate sophisticated optics and a moving light beam are typically not used for conventional illumination but rather are used in association with scientific experimentation and scientific equipment.

SUMMARY OF THE INVENTION

One embodiment of the present invention is a lighting apparatus for illumination of a surface which comprises a source of light, means for concentrating the light from the source to an area, and means for repeatedly moving the concentrated light through a path at a rate of at least ten cycles per second so as to exceed the human eye's ability to integrate the light signal and discern the discontinuities.

One object of the present invention is to provide an improved lighting apparatus.

Related objects and advantages of the present invention will be apparent from the following description.

DESCRIPTION OF THE PREFERRED EMBODIMENTS

Figure 1:
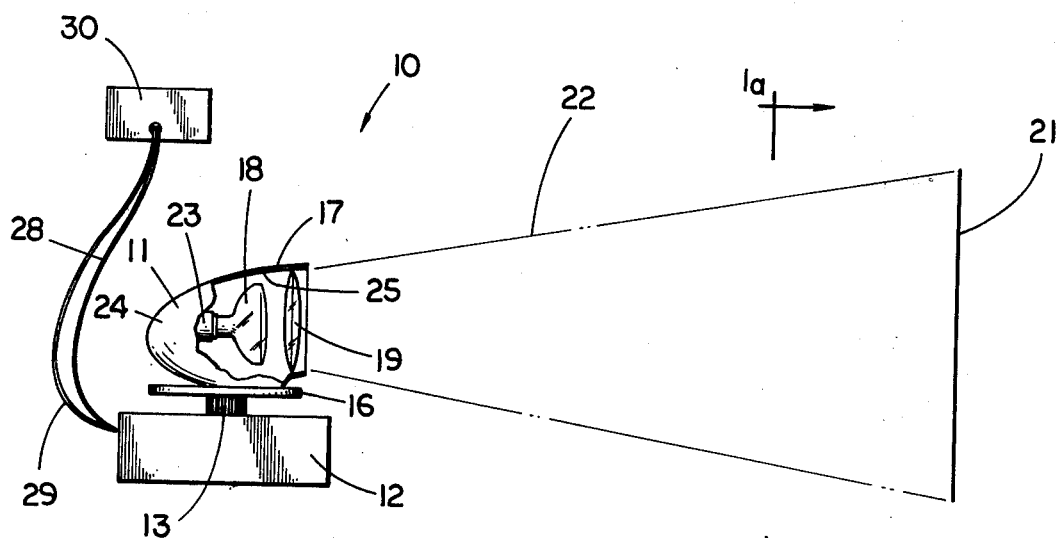
FIG. 1 is a fragmentary elevation of a lighting apparatus according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a lighting apparatus 10 comprising light fixture 11 and an electric motor 12. Light fixture 11 is fixedly mounted onto the output shaft 13 of motor 12 by means of support base 16. Although base 16 and output shaft 13 may be connected to one another in various ways, the preferred method of attachment is for output shaft 13 to be externally splined and base 16 internally splined to mate with shaft 13. The shaft 13 and base 16 are pinned together to prevent the base 16 from lifting up off of motor shaft 13 when light fixture 11 is rotated at a high rate of speed.

Figure 1A:
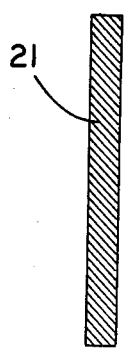
FIG. 1a is an elevation of an area illuminated by the FIG. 1 apparatus.

Light fixture 11 further includes a reflector 17, a light source 18 and a lens 19. Light source 18 is positioned within reflector 17 so that virtually all the light from light source 18 is directed toward lens 19 in such a way that the light beam 22 out of lens 19 is concentrated into an area 21 on a surface as shown by FIGS. 1 and 1a. Although the light source 18 shown appears to be of the "spotlight" variety, a light bulb which sends light initially in all directions could be used. The illustrated mounting position for the base 23 of light source 18 is at the rear 24 of reflector 17. This arrangement is similar to that of an automobile headlamp. The particular curved surface 25 on the inside of reflector 17 has a mirror finish which reflects virtually all of the light given off by light source 18 into lens 19 whose optical geometry and position relative to reflector 17 permit lens 19 to concentrate the light given off by light source 18 into area 21. If lens 19 projects a concentrated column of light which is neither converging or diverging then area 21 will have the same size in both length and width dimensions irrespective of its projected distance away from lighting apparatus 10.

In the event there are slight optical aberrations within lens 19 or if exact placement relative to reflector 17 is not achieved, light beam 22 will be either slightly diverging or slightly converging in both horizontal and vertical directions. This divergence or convergence will cause the size of area 21 to change as a function of its distance from lighting apparatus 10. Certain lighting applications may require that light beam 22 be either diverging or converging only in the vertical direction thus only the length of area 21 will be dependent upon the distance from light source 18. In such an application, the width of area 21 will be constant irrespective of the distance of area 21 from lighting apparatus 10. Consequently, the designs of reflector 17 and lens 19 are to be selected depending upon the resulting light beam pattern which is desired. The height of the light beam pattern desired is determined in the vertical dimension of FIG. 1 by the total height of the area to be illuminated. However, the horizontal dimension of the area 21 is not determined by the total width of the area to be illuminated.

Electric motor 12 is shown with a pair of lines 28 and 29 carrying electrical potential and connected to a power source 30. This power source 30 supplies the power to drive electric motor 12 as well as the power to energize light source 18. Although FIG. 1 suggests a power source as a separate unit, the motor 12 and light source 18 would preferably be plugged into a conventional electrical outlet thereby supplying continuous electrical energy. An alternate arrangement, although not as desirable for continuous use applications, is to connect a battery to motor 12 and a battery to light source 18. The placement and connection of a suitable source of power is such that light fixture 11 is able to be rotated at a high rate of speed by motor 12.

Figure 2:
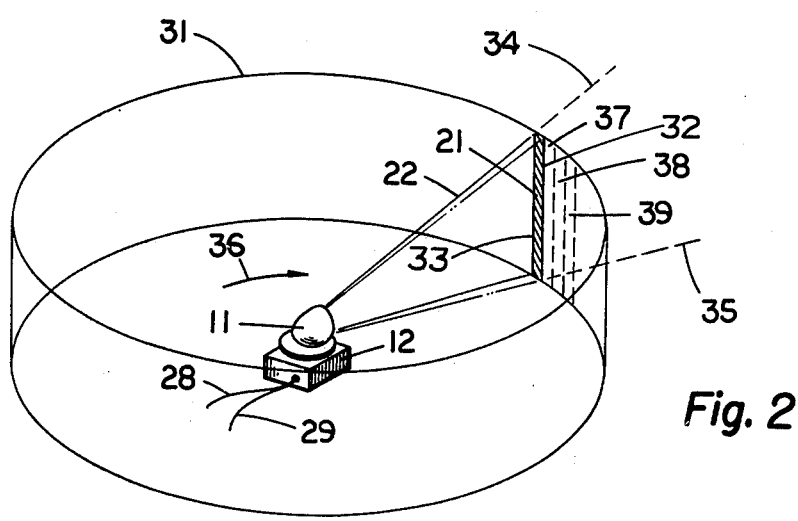
FIG. 2 is a perspective view of a path illuminated by rotation of the FIG. 1 apparatus.

FIG. 2 is a perspective view of lighting apparatus 10, which has previously been described, in which light fixture 11 is cyclically rotated by means of electric motor 12. Area 21 having leading edge 32 and trailing edge 33 is projected onto a surface and as light fixture 11 is rotated, area 21 sweeps a path 31 which is shown as having a cylindrical shape. The shape of the path 31 will be determined, however, in the general case by the surface or surfaces being illuminated. Light beam 22 is shown as being slightly divergent in the vertical plane such that the separation of upper edge 34 thereof and lower edge 35 thereof increases as the distance from light fixture 11 increases. It is to be understood that a non-diverging pattern or converging pattern would be also usable depending on the surface desired to be illuminated. The width dimension of area 21 is along an arc whose length corresponds to approximately 1 percent of the total circumference of path 31. As light fixture 11 is rotated at a constant speed in a clockwise direction, identified by arrow 36, area 21 is moved along path 31; moving first through location 37, then through location 38, then through location 39 and so forth until the entire circumference of path 31 has been traversed by area 21 and then the cycle is repeated.

According to *Concepts of Classical Optics,* written by John Strong, copyright 1958, at page 488; the human eye's ability to integrate a total signal does not extend beyond 1/10 of a second. Strong goes on to say that the time constant for the eye depends in part on the amount of light and that as long as the frame rate (in reference to a motion picture) is above about 16 per second, the eye will not be able to detect the discontinuities. Therefore, if area 21 transverses path 31 at a rate of at least once every 1/10 of a second, but preferably once every 1/16 of a second, the human eye will not be able to detect the discontinuity of the individually-illuminated portions of path 31. The result is that while area 21 is in fact the only area illuminated at a given point in time, by light fixture 11, the entire area of path 31 has the appearance of being illuminated continuously. Virtually all the light from light source 18 is concentrated into area 21. This causes the lumens per square inch brightness of area 21 to be increased many times over what the brightness would be of the same sized area if the light was not concentrated. As area 21 is rotated, path 31 correspondingly appears to the observer to be illuminated at the same or approaching the same brightness as area 21. The present invention produces an illumination which approaches or is equal to the placing of a total of 100 individual light fixtures 11 in a circular array 3.6 degrees apart so that each fixture concentrates an area 21 on a different and adjacent portion of path 31. The figure of 100 is based on the fact that the width of area 21 is an arc equal to 1 percent of the circumference of path 31.

It is important to note that light fixture 11 is dynamically balanced about its axis of rotation so that when rotated at a rate of 600 revolutions per minute or faster, the cyclic rate is uniform, there is a minimum amount of wear on bearing surfaces and a minimum amount of energy is required to rotate light fixture 11.

Figure 3:
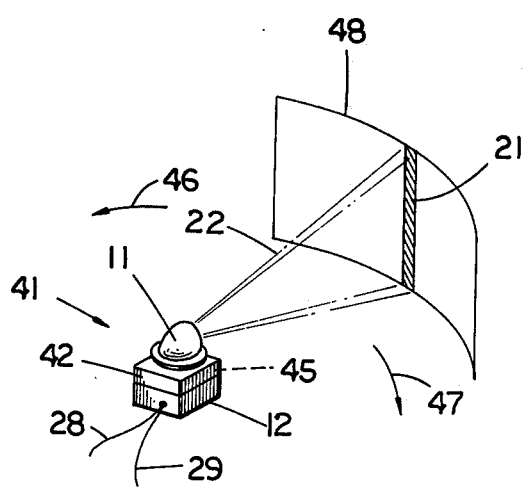
FIG. 3 is a perspective view of the path illuminated by reciprocation of the FIG. 1 apparatus.

FIG. 3 is a perspective view of a lighting apparatus 41 comprising light fixture 11 and drive mechanism 42. Light fixture 11 is the same as that used in FIGS. 1 and 2 and has heretofore been described. Drive mechanism 42 comprises an electric motor 12 and a mechanical linkage 45. The mechanical linkage 45 comprises a series of interconnecting pivoting arms, one of which is driven by the output shaft (not shown) of motor 12. As shaft 13 rotates, the lighting fixture is moved in a reciprocating or oscillating manner back and forth as shown by arrows 46 and 47. Light beam 22 which is concentrated into area 21 as already described, is moved back and forth across region 48 which is thereby illuminated over its entire area in the same fashion that path 31 is totally illuminated. To accomplish this effect to the observer of illumination over the entire area, light fixture 11 must traverse region 48 from one end to the other at least once every 1/10 of a second and preferably once every 1/16 of a second.

As is well known in the art, there are hundreds of arrangements of 4-bar linkages which can be selected for various resultant movement paths. It is to be understood that the lengths of the various bars govern the path and that it is possible to utilize 4-bar linkages in such a way so as to oscillate light fixture 11 back and forth wherein the included angle between the extremes of travel of this oscillatory motion is between 1 degree and 360 degrees.

Figure 4:
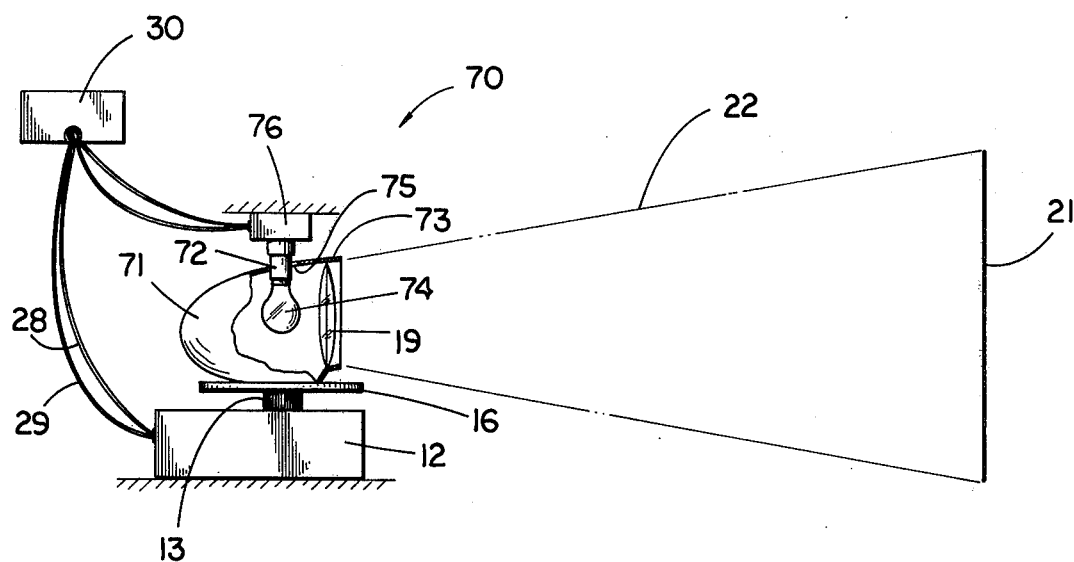
FIG. 4 is a view similar to FIG. 1 of an alternative embodiment of the invention.

The preferred embodiment of the invention is illustrated in FIG. 4 which shows lighting apparatus 70 comprising light fixture 71, electric motor 12 and power source 30. Light fixture 71 which is fixedly mounted onto output shaft 13 by means of support base 16, comprises reflector 73, light source 74 and lens 19. The upper surface of reflector 73 has opening 75 therethrough, and the center of opening 75 is coincident with the axis of rotation of light fixture 71. The base 72 of light source 74 extends through opening 75 and connects to box 76 which receives electrical energy from power source 30. Box 76 is mounted in a fixed position as is motor 12. As support base 16 is driven by motor 12, reflector 73 rotates about its axis. The clearance between the base 72 of light source 74 and the sides of opening 75 permits reflector 73 to rotate about light source 74 while the light source remains stationary. The remaining structure as well as the operation of lighting apparatus 70 is virtually the same as has been described for lighting apparatus 10. Additionally the results achieved by the use of light fixture 71 is virtually the same as achieved by light fixture 11 as shown in FIGS. 2 and 3. As reflector 73 rotates about light source 74, area 21 will sweep through path 31 or scan region 48 as occurs when the light source is rotated with the reflector. Lighting apparatus 70 is particularly well suited for applications where it is not feasible to rotate the light source at a high rate of speed.

Although light fixtures 11 and 71 have been shown in their embodiments as comprising a reflector 17 which is parabolic in cross section and a lens 19, the shape of light beam 22 as concentrated in area 21 could also be achieved by using only a parabolic reflector or reflectors of other shapes or by using only a lens. If only a reflector or only a lens is used, the geometry of the reflector or of the lens will be different than that when a reflector and lens are used together. The choice is one of preference governed by the size and location of lighting apparata 10 or 70 and the size, shape and location of the surface to be illuminated.

Also contemplated within the scope of this invention are the alternatives of using a series of light fixtures 11 or 71 stacked one on top of the other in order to increase the height of path 31 without divergently decreasing the lumens per square inch brightness. Similarly, a plurality of light fixtures 11 or 71 could be placed in an evenly-spaced circular array with each fixture being continuously on so that the speed of motor 12 required to exceed the human eye's ability to integrate the signal is reduced to 1/n of the rate required for a single light fixture 11 or 71, where "n" is the number of light fixtures in the evenly-spaced circular array. Light fixture 11 or 71 can also be tilted in order to change the orientation of path 31 with respect to the axis of rotation of light fixture 11 or 71.

Another alternative contemplated by this invention is to construct the mechanical linkage 45 so that the path which is swept by area 21 is other than a straight line or a part-cylinder as is the surface 48. For example, the repeated path could be a figure "8" or other configuration.

It is to be understood that the size of lighting apparata 10 and 70 is not limited by this application and that the structure and theory of operation described herein are equally applicable to large scale lighting requirements such as an airport runway as well as for smaller requirements such as an automobile dashboard.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A lighting apparatus for illumination of a surface which comprises:
   a plurality of light fixtures, each of said plurality producing concentrated light simultaneously;
   said plurality of light fixtures being arranged in a circular array such that the angular separation between adjacent light fixtures is substantially the same; and
   means for rotating said circular array of said plurality of light fixtures such that said concentrated light from each of said light fixtures moves along a path at a rate equal to at least the cycles per second rate defined by the expression $(1/n)(10)$ wherein n equals the number of light fixtures of said circular array.

2. The lighting apparatus of claim 1 wherein each of said plurality of light fixtures comprises:
   a reflector;
   a lens; and
   a source of light positioned between said lens and said reflector.

3. The lighting apparatus of claim 2 which further includes a linkage cooperating with said rotating means, said linkage producing movement of said circular array in a back and forth reciprocating manner.

4. The lighting apparatus of claim 3 wherein n equals 4 and said back and forth reciprocating movement is through an angle of less than 90 degrees.

5. A lighting apparatus for illumination of a surface which comprises:
   (a) a light fixture comprising:
      (1) a reflector;
      (2) a lens; and
      (3) a source of light positioned between said lens and said reflector;
   (b) said reflector and said lens concentrating the light from said source to an area for illumination thereof; and
   (c) means for cyclicly moving said entire light fixture such that said concentrated light moves along a path, said moving means comprising a motor in cooperation with linkage means and said path being of a figure "8" shape, said path being traversed by said concentrated light at a rate of at least once every 1/10 of a second.

* * * * *